(12) United States Patent
Fekete et al.

(10) Patent No.: US 9,810,185 B2
(45) Date of Patent: Nov. 7, 2017

(54) VEHICLE FUEL SYSTEM

(71) Applicant: MOSAIC TECHNOLOGY DEVELOPMENT PTY LTD, Brisbane (AU)

(72) Inventors: Derek Shane Fekete, Brisbane (AU); Paul Anthony Whiteman, Brisbane (AU)

(73) Assignee: MOSAIC TECHNOLOGY DEVELOPMENT PTY LTD, Crestmead (AU)

( * ) Notice: Subject to any disclaimer, the term of this patent is extended or adjusted under 35 U.S.C. 154(b) by 0 days.

(21) Appl. No.: 15/103,422

(22) PCT Filed: Dec. 11, 2014

(86) PCT No.: PCT/AU2014/050419
§ 371 (c)(1),
(2) Date: Jun. 10, 2016

(87) PCT Pub. No.: WO2015/085371
PCT Pub. Date: Jun. 18, 2015

(65) Prior Publication Data
US 2016/0312750 A1    Oct. 27, 2016

(30) Foreign Application Priority Data

Dec. 12, 2013 (AU) ............................ 2013904846

(51) Int. Cl.
*F02M 21/02* (2006.01)
*F02M 37/00* (2006.01)
(Continued)

(52) U.S. Cl.
CPC ........... *F02M 37/0064* (2013.01); *F02B 7/06* (2013.01); *F02D 19/10* (2013.01);
(Continued)

(58) Field of Classification Search
CPC ............... F02M 37/0064; F02M 37/14; F02M 21/0021; F02M 21/0245; F02M 21/0215;
(Continued)

(56) References Cited

U.S. PATENT DOCUMENTS 7,222,015 B2 * 5/2007 Davis .................... F02D 19/027
701/103
7,523,747 B2 * 4/2009 Gachik .................. F02M 17/22
123/525

(Continued)

FOREIGN PATENT DOCUMENTS

| CN | 201963413 U | 9/2011 |
|---|---|---|
| WO | 2008/036999 A1 | 4/2008 |
| WO | 2010/121306 A1 | 10/2010 |

OTHER PUBLICATIONS

International Search Report and Written Opinion for Int. App. No. PCT/AU2014/050419, dated Mar. 5, 2015.

(Continued)

Primary Examiner — Hai Huynh
(74) Attorney, Agent, or Firm — McDonnell Boehnen Hulbert & Berghoff LLP

(57) ABSTRACT

An improved vehicle fuel system enables mixing of natural gas and a liquid fuel upstream of a combustion cylinder. According to some embodiments the system includes: a gas pressure vessel and associated gas pressurization system to deliver natural gas at a desired pressure; a liquid fuel storage vessel and associated reservoir pump to deliver liquid fuel at a desired pressure; a mixing system configured to receive and mix the liquid fuel from the liquid fuel storage vessel and natural gas from the gas pressure vessel to produce a homogeneous fluid fuel mixture; and a common rail system connecting the mixing system to an engine that consumes the homogeneous fluid fuel.

14 Claims, 10 Drawing Sheets

(51) Int. Cl.
 F02D 19/10 (2006.01)
 F02B 7/06 (2006.01)
 F02M 37/14 (2006.01)
 F02M 55/02 (2006.01)
 F02M 61/14 (2006.01)
 F02D 19/06 (2006.01)

(52) U.S. Cl.
 CPC .... *F02M 21/0215* (2013.01); *F02M 21/0221* (2013.01); *F02M 21/0245* (2013.01); *F02M 21/0248* (2013.01); *F02M 37/14* (2013.01); *F02M 55/025* (2013.01); *F02M 61/14* (2013.01); *F02D 19/0663* (2013.01); *Y02T 10/36* (2013.01)

(58) Field of Classification Search
 CPC .. F02M 21/0248; F02M 61/14; F02M 55/025; F02B 7/06; F02D 19/10; F02D 19/0663; Y02T 10/36
 USPC ... 123/27 GE, 525, 431, 575, 456, 568, 510, 123/511, 1, 3
 See application file for complete search history.

(56) References Cited

U.S. PATENT DOCUMENTS

| | | | | |
|---|---|---|---|---|
| 7,721,720 | B2* | 5/2010 | Payne | F02D 33/006 123/575 |
| 8,006,677 | B2* | 8/2011 | Williams | F02D 19/0605 123/575 |
| 8,245,695 | B2 | 8/2012 | Martin | |
| 8,726,852 | B2* | 5/2014 | Gurin | F02M 37/0064 123/1 A |
| 8,903,630 | B2* | 12/2014 | Pursifull | F02D 19/0615 123/431 |
| 9,422,900 | B2* | 8/2016 | Pursifull | F02D 19/0613 |
| 9,494,074 | B2* | 11/2016 | Jaasma | |
| 2004/0139944 | A1* | 7/2004 | Nakano | F02D 19/0647 123/406.47 |
| 2009/0084366 | A1* | 4/2009 | Gachik | F02B 21/00 123/585 |
| 2011/0011369 | A1* | 1/2011 | Jaasma | F02D 19/0647 123/304 |
| 2011/0155102 | A1* | 6/2011 | Ten Broeke | F02D 19/0605 123/446 |
| 2016/0153354 | A1* | 6/2016 | Nichols | F02M 43/00 123/294 |
| 2017/0009670 | A1* | 1/2017 | Sorge | F02D 19/0615 |

OTHER PUBLICATIONS

International Preliminary Report on Patentability for Int. App. No. PCT/AU2014/050419, dated Feb. 15, 2016.

\* cited by examiner

VEHICLE FUEL SYSTEM

CROSS REFERENCE TO RELATED APPLICATIONS

The present application is a U.S. National Phase Application pursuant to 35 U.S.C. §371 of International Application No. PCT/AU2014/050419 filed Dec. 11, 2014, which claims priority to Australian Patent Application No. 2013904846 filed Dec. 12, 2013. The entire disclosure contents of these applications are herewith incorporated by reference into the present application.

FIELD OF THE INVENTION

This invention relates to a vehicle fuel system. In particular, the invention relates to a vehicle fuel system, typically for direct injected compression ignition or spark ignition engines, utilising natural gas fuel in combination with liquid fuels including hydrocarbons, ethers, alcohols and acetyls.

BACKGROUND TO THE INVENTION

Vehicles that are powered by natural gas are typically considered to be more environmentally friendly than petrol or diesel fuelled vehicles. The carbon emissions of natural gas vehicles are considerably lower than that of vehicles powered using liquid fuels such as petrol or diesel. Traditionally there is also a cost saving in relation to the price of natural gas when compared to diesel fuels.

Spark ignition (petrol) engines may be modified relatively simply to operate on natural gas or liquid petroleum gas. However these engines have limited suitability for use in mobile high horsepower applications such as highway trucks and are generally significantly less efficient than compression ignition (diesel) engines. This significantly lower efficiency is primarily due to the lower compression ratio used in engines that compress a fuel mixture in the cylinder to prevent pre-ignition of the fuel mixture before the spark plug is fired. In heavy duty highway truck applications, a typical modern spark ignition engine will have a compression ratio around 11, whereas the compression ratio of a modern diesel engine will be between 16 and 18.

Over the past two decades a number of compression ignition engines have been developed to use diesel and natural gas together. These engines may utilise separate or integrated injectors to introduce streams of diesel and natural gas into the cylinders. The diesel is typically a "pilot" fuel that provides ignition of the natural gas—the gas being the majority of the fuel in the combustion process. Engines must be specially designed to accommodate two injectors or, alternatively, very complex single injectors utilising parallel or concentric injection paths may be used. Regardless of injector type, high pressure gas injectors generally suffer accelerated wear due to the absence of effective lubrication in the fuel. Also, diesel injectors may limit the minimum diesel flow due to turndown limitations in their design or have poor atomisation characteristics at low diesel flows.

Where direct (cylinder) gas injectors have been developed they have universally suffered from high wear rates due to the absence of lubricating qualities in natural gas fuel.

Further, a number of gas/diesel fuel systems have been developed wherein the primary fuel for the engine is diesel, and natural gas is used to supplement the diesel fuel. In these systems the natural gas is introduced with the combustion air and compressed in the cylinder. These systems have only limited ability to displace the primary diesel fuel, and when the proportion of diesel displacement is pushed above 50% they are prone to pre-ignition and detonation problems which can cause serious engine damage. Additionally at diesel displacement levels around 50%, the economics of converting engines to gas are poor.

There is therefore a need for an improved vehicle fuel system.

OBJECT OF THE INVENTION

It is an object of the invention to overcome or at least alleviate one or more of the above disadvantages and/or provide the consumer with a useful or commercial choice.

SUMMARY OF THE INVENTION

In one form the invention resides in a vehicle fuel system comprising:
a gas pressure vessel and associated gas pressurisation system to deliver natural gas at a desired pressure;
a liquid fuel storage vessel and associated reservoir pump to deliver liquid fuel at a desired pressure;
a mixing system configured to receive and mix the liquid fuel from the liquid fuel storage vessel and natural gas from the gas pressure vessel to produce a homogeneous fluid fuel mixture; and
a common rail system connecting the mixing system to an engine that consumes the homogeneous fluid fuel mixture.

Preferably, the mixing system includes a first mixer. Preferably, the first mixer is configured to receive and mix the liquid fuel from the liquid fuel storage vessel and natural gas from the gas pressure vessel to produce a homogeneous liquid fuel mixture.

Preferably, the homogeneous liquid fuel mixture includes liquid fuel that is saturated with natural gas. Preferably, a significant quantity of natural gas is contained in the homogeneous liquid fuel mixture in order to enhance the atomisation of the liquid fuel mixture in a combustion chamber of the engine.

Preferably, the first mixer is a pressure vessel with at least one top opening and at least one bottom opening. Preferably, a liquid fuel injector that is connected to the liquid storage vessel is connected to the at least one top opening. Preferably, the at least one top opening is connected to the associated gas pressurisation system. Preferably, the at least one top opening includes two top openings and the liquid fuel injector and associated gas pressurisation system are respectively connected thereto. Preferably, a level transducer is fitted to the at least one bottom opening. Preferably, the at least one bottom opening is connected to the common rail system. Preferably, the at least one bottom opening includes two bottom openings and the level transducer and common rail system are respectively connected thereto.

Preferably, at least one injector is configured to inject the homogeneous liquid fuel mixture from the common rail system into the engine. Preferably, the at least one injector injects the combined homogeneous at between 250 barg and 350 barg. Preferably, the at least one injector injects the homogeneous liquid fuel mixture at between 200 barg and 500 barg. Preferably, the at least one injector is mounted to deliver the homogeneous liquid fuel mixture directly into a combustion chamber of the engine.

Optionally, the at least one injector may be remotely mounted adjacent to the combustion chamber with a capillary pathway delivering the homogeneous liquid fuel mixture into the combustion chamber.

Preferably, the vehicle fuel system further includes a high pressure pump to increase the pressure of the homogeneous liquid fuel mixture before being consumed by the engine. Preferably, the high pressure pump is connected to a liquid fuel common rail system. Preferably, as a safeguard to the homogeneous liquid fuel mixture being heated in the liquid fuel common rail, the high pressure pump increases the pressure of the homogeneous liquid fuel mixture to a pressure sufficient to ensure the natural gas component of the homogeneous liquid fuel mixture remains in solution. For example, as a safeguard to the homogeneous liquid fuel mixture being heated between the first mixer and the least one injector, the high pressure pump increases the pressure of the homogeneous liquid fuel mixture to a pressure sufficient to ensure the natural gas component of the homogeneous liquid fuel mixture remains in solution.

Preferably, the mixing system includes a second mixer. Preferably, the second mixer is configured to receive and mix the liquid fuel from the liquid fuel storage vessel and natural gas from the natural gas delivery system to produce a homogeneous gas fuel mixture mixture.

Preferably, the amount of liquid fuel in the homogeneous gas fuel mixture is sufficient to impart a lubricating quality to the natural gas. Preferably, the homogeneous gas fuel mixture ranges from a saturated state to a lean state. Preferably, the saturated state contains approximately 20% liquid fuel. Preferably, the lean state includes sufficient liquid fuel to impart a lubricating quality to the natural gas.

Preferably, the lubricating quality of the natural gas provides a sustained life for at least one injector configured to inject the homogeneous gas fuel mixture mixture from the gas fuel common rail system into the engine.

Preferably, the liquid fuel includes hydrocarbons, ethers, alcohols and/or acetyls. Preferably, the liquid fuel is diesel. Preferably, the engine is a compression ignition engine.

Preferably, the associated gas pressurisation system includes a gas booster which maintains the delivery pressure of the natural gas within a desired range as it is withdrawn from the gas pressure vessel. Alternatively or additionally, the associated gas pressurisation system includes a LNG high pressure vaporiser which maintains the delivery pressure of the natural gas within a desired range.

Preferably, the associated gas pressurisation system includes the second mixer. Preferably, the second mixer integrated into the associated gas pressurisation system includes an injector mounted on the first stage gas cylinder(s) of the gas booster and a control system that enables precise quantities of liquid fuel to be introduced into the known quantity of natural gas that is introduced into the booster. Preferably, the known quantity of natural gas is introduced on an intake stroke of the booster.

Preferably, the common rail system includes a gas fuel common rail. Preferably, the homogeneous gas fuel mixture is supplied to the gas fuel common rail. Preferably, at least one gas fuel injector is connected to the gas fuel common rail. Preferably, the at least one gas fuel injector is configured to supply the homogeneous gas fuel mixture to a combustion chamber of the compression ignition engine.

Preferably, the common rail system includes a liquid fuel common rail. Preferably, the liquid fuel common rail is connected to the liquid fuel storage vessel. Preferably, at least one liquid fuel injector is connected to the liquid fuel common rail. Preferably, a pump provides pressurized liquid fuel from the liquid fuel storage to the at least one liquid fuel injector. Preferably, the at least one liquid fuel injector is configured to supply pressurized liquid fuel into the combustion chamber such that it is used to initiate the combustion of the homogeneous gas fuel mixture. Preferably, liquid fuel that is not injected into the combustion chamber is returned to the liquid fuel storage vessel.

Preferably, the at least one gas fuel injector is mounted to deliver the homogeneous gas fuel mixture directly into a combustion chamber of the engine. Preferably, the at least one liquid fuel injector is mounted to deliver the homogeneous liquid fuel mixture directly into a combustion chamber of the engine.

Optionally, the at least one gas fuel injector is mounted adjacent to the combustion chamber with a capillary pathway delivering the fuel into the combustion chamber.

Preferably, the homogeneous liquid fuel mixture is supplied to the liquid fuel common rail. Preferably, the homogeneous liquid fuel mixture is injected into the combustion chamber by the at least one liquid fuel injector. Preferably, the at least one liquid fuel injector injects the combined homogeneous at between 250 barg to 350 barg. Preferably, the at least one liquid fuel mixture injector injects the homogeneous liquid fuel mixture at between 200 barg and 500 barg. Preferably, the homogeneous liquid fuel mixture is used to initiate the combustion of the homogeneous gas fuel mixture mixture.

Preferably, the system includes a pressure swing upwards, after the first mixer, to further ensure homogenous mixing of the homogenous liquid fuel mixture.

Preferably, the system includes a temperature swing downwards, after the first mixer, to further ensure homogenous mixing of the homogenous liquid fuel mixture.

Preferably, the system includes both a pressure swing upwards and a temperature swing downwards, after the first mixer, to further ensure homogenous mixing of the homogeneous liquid fuel mixture.

Preferably, the first mixer may be heated directly or heated using diesel circulated through the first mixer.

Optionally, the at least one gas fuel injector and/or the at least one liquid fuel injector are mounted adjacent to the combustion chamber with one or more capillary pathways delivering the homogeneous gas fuel mixture and the homogeneous liquid fuel mixture into the combustion chamber.

Preferably, the gas pressure vessel, the liquid storage vessel, the high pressure pump and the engine may be standard industry available components as is known in the art.

In another form, the invention resides in a fuel mixing system separated from the vehicle comprising:
a natural gas source;
a natural gas delivery system configured to deliver natural gas from the natural gas source at a desired pressure;
a liquid fuel storage vessel and pump to deliver liquid fuel at a desired pressure; and
a mixer to receive and mix the liquid fuel from the liquid fuel storage vessel and natural gas from the natural gas delivery system to produce a combined homogeneous gas fuel mixture.

Preferably, the mixing system further includes a gas pressure vessel to store the combined homogeneous gas fuel mixture at a desired pressure for later use as vehicle fuel.

Preferably, the amount of liquid fuel in the homogeneous gas fuel mixture is sufficient to impart a lubricating quality to the natural gas. Preferably, the combined homogeneous gas fuel mixture ranges from a saturated state to a lean state. Preferably, the saturated state contains approximately 20% liquid fuel. Preferably, the lean state includes sufficient liquid fuel to impart a lubricating quality on the natural gas which provides a sustained life for the direct gas fuel injector in a compression or spark ignition engine.

Preferably the amount of liquid fuel in the homogeneous gas fuel mixture is sufficient to result in a significant increase in the energy density of the homogeneous gas fuel mixture due to improved molecular packing of the natural gas in the presence of the higher hydrocarbons.

Preferably, the liquid fuel includes hydrocarbons, ethers, alcohols and/or acetyls. Preferably, the liquid fuel is diesel.

Preferably, the natural gas delivery system includes a CNG compressor, a gas booster, an LNG high pressure vaporiser or some other device or combination of devices which maintain the delivery pressure of the natural gas fuel within a desired range.

Preferably, the gas pressure vessel and the liquid fuel storage vessel may be standard industry available components as is known in the art.

In another form the invention resides in an on vehicle premixed fuel system comprising:

a gas pressure vessel configured to receive a homogeneous gas fuel mixture including natural gas mixed with a liquid fuel;

an associated gas pressurisation system to deliver the homogeneous gas fuel mixture at a desired pressure;

a liquid fuel storage vessel and associated pump to deliver liquid fuel at a desired pressure;

a gas fuel common rail connecting the gas pressure vessel to an engine that consumes the homogeneous gas fuel mixture; and a liquid fuel common rail connecting the liquid fuel from the liquid fuel storage vessel to an engine that is used to initiate the combustion of the homogeneous gas fuel mixture.

Preferably, the amount of liquid fuel in the homogeneous gas fuel mixture is sufficient to impart a lubricating quality on the natural gas.

Preferably, the homogeneous gas fuel mixture ranges from a saturated state to a lean state. Preferably, the saturated state contains approximately 20% liquid fuel. Preferably, the lean state includes sufficient liquid fuel to impart a lubricating quality on the natural gas which provides a sustained life for the direct gas fuel injector in a compression or spark ignition engine. Preferably the amount of liquid fuel in the homogeneous gas fuel mixture is sufficient to result in a significant increase in the energy density of the homogeneous gas fuel mixture due to improved molecular packing of the natural gas in the presence of the higher hydrocarbons.

Preferably, the liquid fuel includes hydrocarbons, ethers, alcohols and/or acetyls. Preferably, the liquid fuel is diesel. Preferably, the engine is a compression ignition engine.

BRIEF DESCRIPTION OF THE DRAWINGS

To assist in understanding the invention and to enable a person skilled in the art to put the invention into practical effect, a number of embodiments of the invention will be described, by way of example only, with reference to the accompanying figures, wherein.

DETAILED DESCRIPTION OF THE INVENTION

At the outset, an aspect of the invention relates to a vehicle fuel system, typically for direct injected compression ignition or spark ignition engines, utilising natural gas fuel in combination with liquid fuel including hydrocarbons, ethers, alcohols and acetyls. In this detailed description, diesel is used as an example of these liquid fuels as it is the most commonly available and the best understood as a liquid fuel used in a compression ignition engine.

In this patent specification, adjectives such as first and second, left and right, front and back, top and bottom, etc., are used solely to define one element or method step from another element or method step without necessarily requiring a specific relative position or sequence that is described by the adjectives. Words such as "comprises" or "includes" are not used to define an exclusive set of elements or method steps. Rather, such words merely define a minimum set of elements or method steps included in a particular embodiment of the present invention.

The reference to any prior art in this specification is not, and should not be taken as, an acknowledgement or any form of suggestion that the prior art forms part of the common general knowledge.

Figure 1:
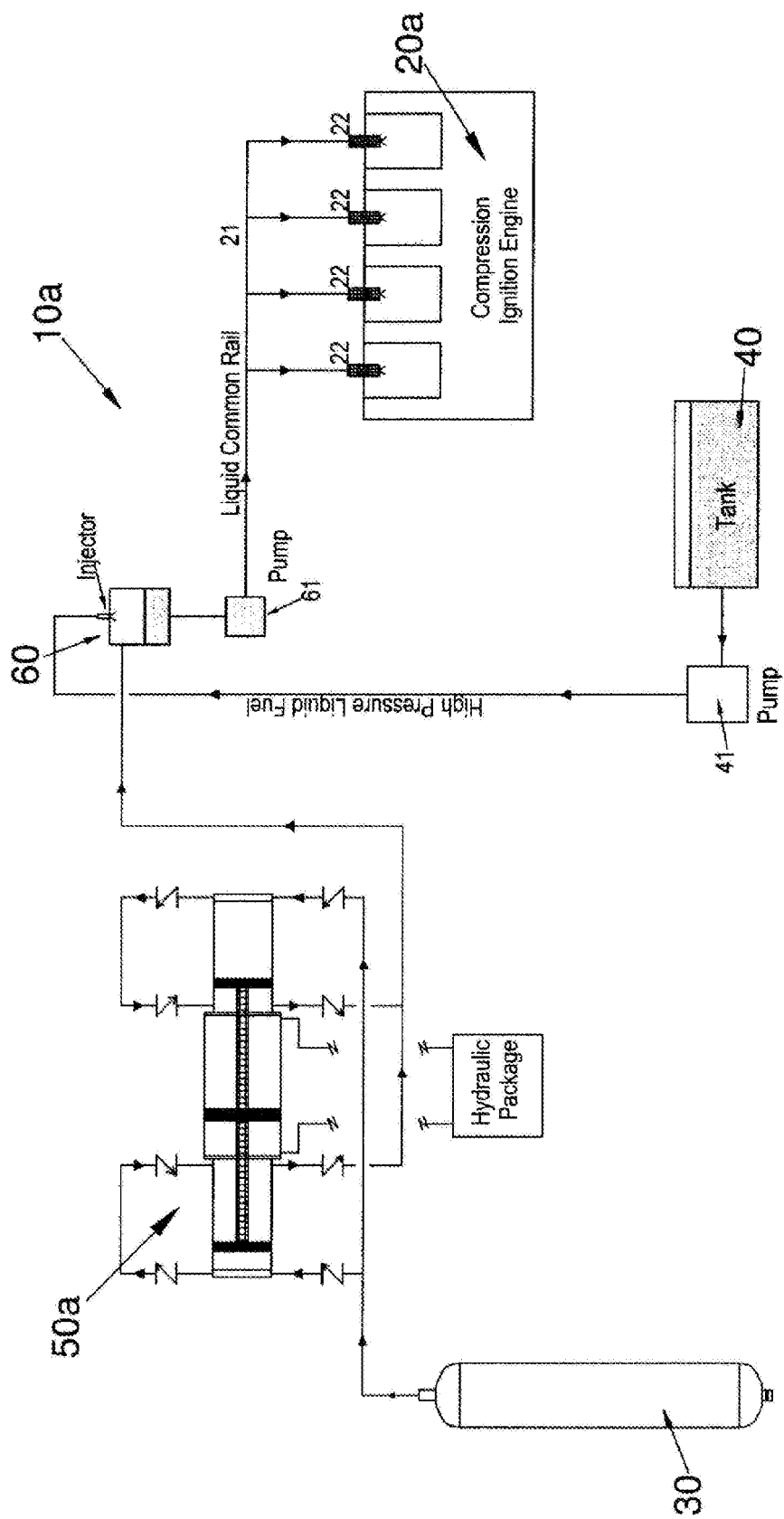
FIG. 1 is a schematic representation of an on-vehicle fuel system according to a first embodiment of the invention.

FIG. 1 shows a first embodiment of a vehicle fuel system 10a. The vehicle fuel system 10a includes an engine in the form of a common rail direct injection engine 20a, a gas pressure vessel 30, a diesel storage vessel 40, an associated gas pressurisation system in the form of gas booster 50a and a mixing system including a first mixer 60.

In this disclosure the use of a reference numeral followed by a lower case letter indicates alternative embodiments of a general element identified by the reference numeral. Thus for example a gas booster 50a is similar to but not identical to a gas booster 50b. Further, references to an element identified only by the numeral refer to all embodiments of that element. Thus for example a reference to a gas booster 50 is intended to include both the gas booster 50a and the gas booster 50b.

The common rail engine 20a is fitted with a common rail system including a liquid fuel common rail 21. Connected to the liquid fuel common rail 21 is a set of liquid fuel injectors 22.

The liquid fuel common rail 21 is connected to the first mixer 60 via a high pressure pump 61. The common rail engine 20a is a standard engine as known to people skilled in the art. It should be appreciated that the size of the engine and number of liquid fuel injectors 22 may be varied.

The gas pressure vessel 30 holds natural gas. The gas booster 50a increases the pressure of the natural gas as it is withdrawn from the pressure vessel 30 to a desired pressure.

The diesel storage vessel 40 is used to hold diesel. However, it should be appreciated that other liquid fuels may also be utilised. The diesel storage vessel 40 is therefore a liquid storage vessel. A diesel storage vessel pump 41 is connected to the diesel storage vessel 40 in order to pump diesel from the diesel storage vessel 40 to the first mixer 60.

The first mixer 60 is connected to both the diesel storage vessel 40, via pump 41, and the gas pressure vessel 30, via the gas booster 50*a*. The first mixer 60 includes two top openings that are respectively connected to the diesel storage vessel 40 and the gas booster 50*a*. The first mixer 60 also includes two bottom openings. One of the bottom openings is connected to the liquid fuel common rail 21 and the other is connected to a level transducer (not shown).

The first mixer 60 is used to mix natural gas supplied from the gas pressure vessel 30 and diesel supplied from the diesel storage vessel 40. In this embodiment, the first mixer 60 is therefore used to produce a homogeneous fluid fuel in the form of a homogeneous liquid fuel mixture that includes diesel fuel saturated with gas. The high pressure pump 61 increases the pressure of the combined homogeneous liquid fuel to ensure it remains as a single phase fluid in the liquid fuel common rail 21.

According to some embodiments, pressure is increased after the first mixer 60 to de-saturate the natural gas in diesel and ensure a homogenous fluid. In other embodiments, the temperature is lowered after the first mixer 60 to de-saturate the gas in the diesel and ensure a homogenous fluid. Further, according to some embodiments, both strategies may be used together.

Further, according to some embodiments the first mixer 60 may be heated by for example engine jacket water to ensure the saturated mix is at engine temperature when saturated and optionally cooled post first mixer 60 to further ensure the mix will remain homogenous.

Also, according to some embodiments hot diesel may be circulated through the first mixer 60 as a heating method for the first mixer 60 ensuring the mix is at engine temperature when saturated and will remain homogenous.

In use, natural gas is supplied from the gas pressure vessel 30 at the desired pressure by the gas booster 50*a*, through a gas line, into the first mixer 60. Simultaneously, diesel is pumped by the diesel pump 41 from the diesel storage vessel 40 into the first mixer 60. The natural gas and diesel are mixed in the first mixer 60 to produce a homogeneous liquid fuel mixture that includes diesel saturated with natural gas.

The homogeneous liquid fuel mixture is supplied to the common rail engine 20*a*, via the high pressure pump 61 and then to the liquid fuel common rail 21, where it is injected through the liquid fuel injectors 22 into the engine 20*a*. The homogeneous liquid fuel mixture is injected into the engine 20*a* at approximately 350 barg. The homogeneous liquid fuel mixture is configured to spontaneously combust in the engine 20*a*.

The homogeneous liquid fuel mixture lubricates the liquid fuel mixture injectors 22 and the dissolved natural gas displaces a significant quantity of the liquid fuel mixture (e.g., diesel) normally required by the engine 20*a*. Additionally, the dissolved gas significantly enhances the atomisation of the diesel which improves the combustion characteristics in the combustion chamber of the engine 20*a*. As mentioned above, the nature of this homogeneous liquid fuel mixture is that it spontaneously combusts at typical temperatures generated on the compression stroke of the compression ignition engine 20*a*.

It will be apparent to those skilled in the art that a lesser quantity of gas can be mixed with the diesel to produce an under saturated liquid fuel mixture that retains the benefits of the saturated mixture (i.e. allows lubrication of the liquid fuel injectors 22).

This embodiment of the invention may also be coupled to a low pressure dual fuel system as is known in the art to increase the quantity of diesel displaced by gas.

Figure 2:
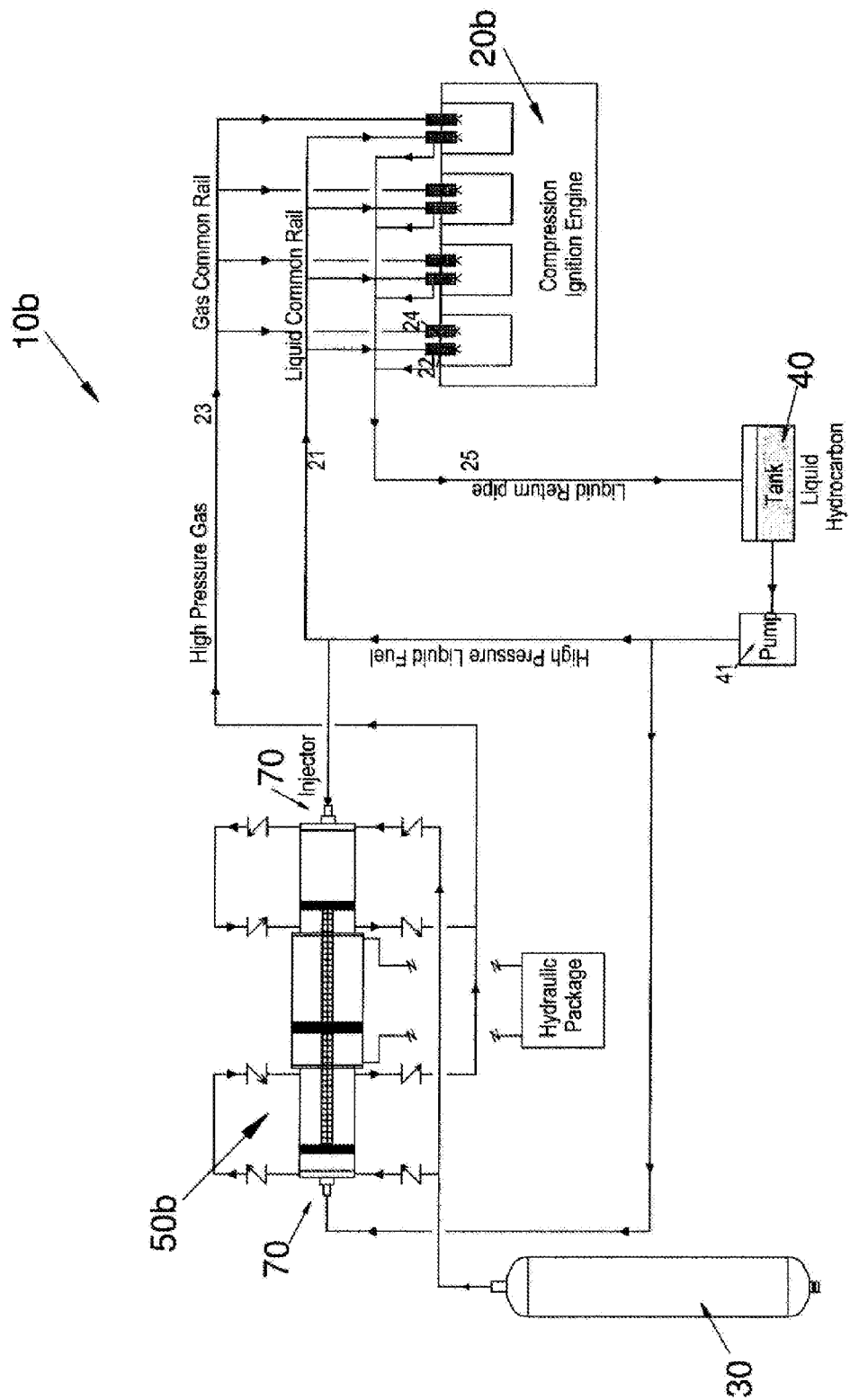
FIG. 2 is a schematic representation of an on-vehicle fuel system according to a second embodiment of the invention.

FIG. 2 shows a second embodiment of a vehicle fuel system 10*b* and like numbering from FIG. 1 is used. The vehicle fuel system 10*b* includes an engine in the form of a common rail direct injection engine 20*b*, a gas pressure vessel 30, a diesel storage vessel 40, an associated gas pressurisation system in the form of a gas booster 50*b* and a second mixer in the form of mixing systems 70 comprising an injector and an intake cylinder on either end of the gas booster 50*b*.

The gas pressure vessel 30 holds natural gas. The gas booster 50*b* increases the pressure of the natural gas as it is withdrawn from the pressure vessel 30 to a desired pressure. The mixing systems 70 are integrated into the gas booster 50*b*.

The diesel storage vessel 40 is typically used to hold diesel. However, it should be appreciated that other liquid fuels may also be utilised. The diesel storage vessel 40 is therefore a liquid storage vessel. A diesel storage vessel pump 41 is connected to the diesel storage vessel 40 in order to pump diesel from the diesel storage vessel 40.

The mixing systems 70 are connected to both the diesel storage vessel 40, via pump 41, and the gas pressure vessel 30, via the gas booster 50*b*. The mixing systems 70 are used to mix natural gas supplied from the gas pressure vessel 30 and diesel supplied from the diesel storage vessel 40.

The mixing systems 70 mix the natural gas and the diesel in an intake cylinder of the gas booster 50*b*. The mixing systems 70 produce a homogeneous gas fuel mixture that can range from diesel saturated natural gas, with typically 20% of the mixture being diesel, to a lean mixture with a low diesel content that remains sufficient to impart a lubricating quality to the natural gas. The lubricating quality that is imparted onto the natural gas provides a sustained life for the fuel injector(s) in a compression or spark ignition engine 20*b*, as discussed below.

The common rail engine 20*b* is fitted with a common rail system including a liquid fuel common rail 21 and a gas fuel common rail 23. Connected to the liquid fuel common rail 21 is a set of liquid fuel injectors 22. Connected to the gas fuel common rail 23 is a set of gas fuel injectors 24.

The liquid fuel common rail 21 is connected to the diesel pump 41 and the gas fuel common rail 23 is connected to the mixing systems 70 (that are integrated with the gas booster 50*b*). The common rail engine 20*b* is a standard engine as known to people skilled in the art. It should be appreciated that the size of the engine 20*b* and number of injectors 22, 24 may be varied.

The injectors 22, 24 may be electrically activated or electro mechanically activated. Furthermore, the liquid fuel injectors 22 may be connected to a liquid return line 25 in which case part of the liquid fuel delivered thereto is returned to the diesel vessel 40.

In use, natural gas is supplied from the gas pressure vessel 30 at the desired pressure by the gas booster 50*b* through a gas line, into the mixing systems 70. Simultaneously, diesel is pumped by the diesel pump 41 from the diesel storage vessel 40 into the mixing systems 70. The natural gas and diesel are mixed in the mixing systems 70 to produce a homogeneous gas fuel mixture which gives the natural gas lubricity thereby providing a sustained life for the gas fuel injectors 24. The homogeneous gas fuel mixture is supplied to the common rail engine 20*b*, via the gas common rail 23, where it is injected through the gas injectors 24.

Simultaneously, a portion of the diesel pumped by the diesel pump 41 from the diesel storage vessel 40 is directed through a liquid fuel mixture line to the liquid fuel common rail 21. From the liquid fuel common rail 21, the diesel is injected into combustion chamber of the engine 20*b*, via the liquid fuel injectors 22, where it spontaneously combusts. The spontaneous combustion of the diesel also causes the homogeneous gas fuel mixture to also combust. Any diesel fuel that is not utilised by the common rail engine 20*b* is passed back into the diesel storage vessel 40 through the liquid return line 25.

This embodiment of the invention may also be coupled to a low pressure dual fuel system as is known in the art to reduce the quantity of natural gas requiring delivery at high pressure. This allows from smaller components to be used in the system 10*b*.

Figure 3:
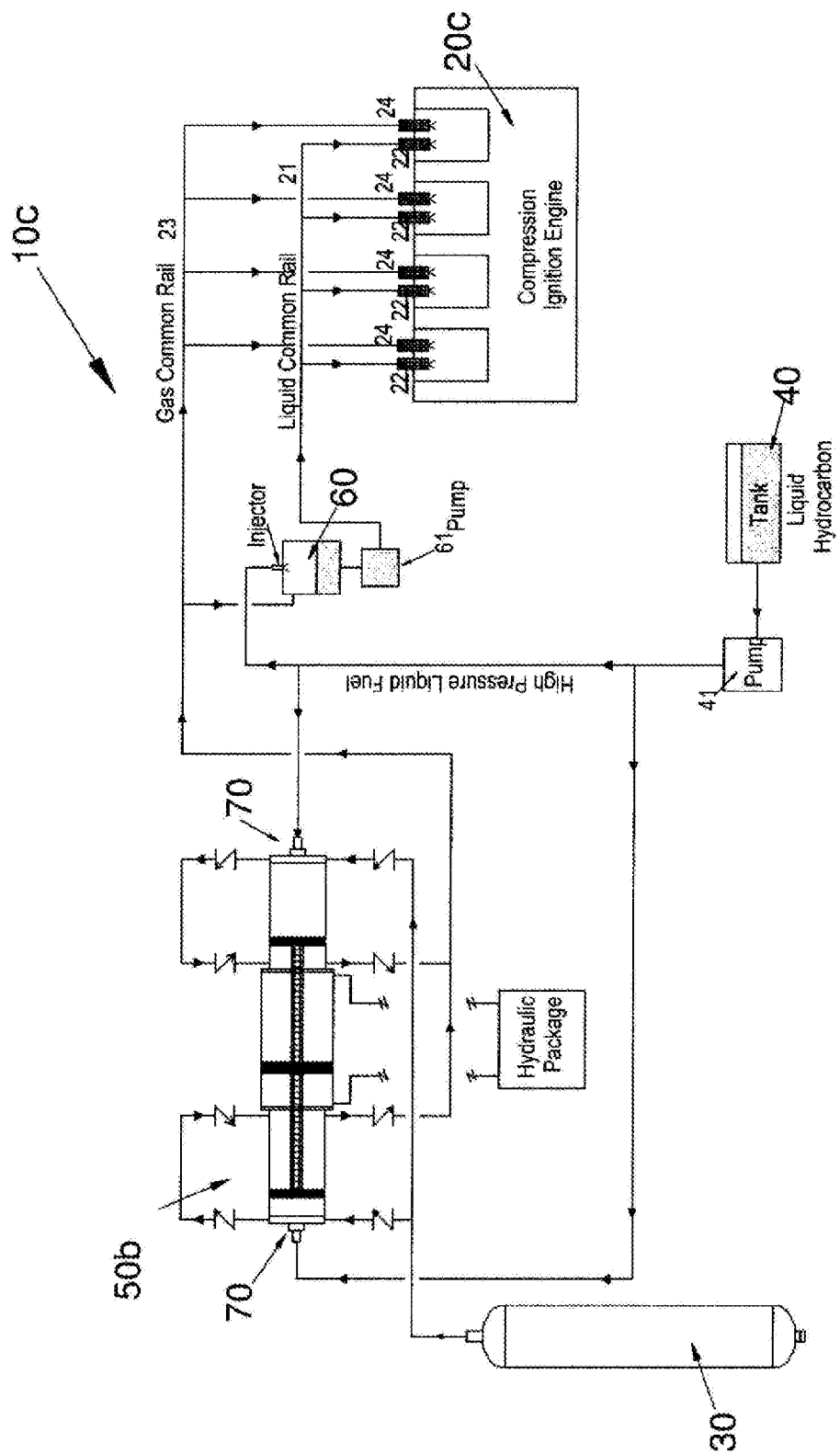
FIG. 3 is schematic representation of an on-vehicle fuel system according to a third embodiment of the invention.

FIG. 3 shows a third embodiment of the present invention including a vehicle fuel system 10*c*, comprising the combination of the first two embodiments (i.e., FIG. 2 and FIG. 3) of the vehicle fuel system 10*a* and system 10*b* described above. The vehicle fuel system 10*c* in FIG. 3 includes an engine in the form of a common rail direct injection engine 20*b*, a gas pressure vessel 30, a diesel storage vessel 40, an associated gas pressurisation system in the form of gas booster 50*b* and a mixing system including a first mixer 60 and mixing systems 70.

The gas pressure vessel 30 holds natural gas. The gas booster 50*b* increases the pressure of the natural gas as it is withdrawn from the gas pressure vessel 30 to a desired pressure. Similar to the above, the diesel storage vessel 40 is typically used to hold diesel. However, it should be appreciated that other liquid fuels may also be utilised. A diesel storage vessel pump 41 is connected to the diesel storage vessel 40 in order to pump diesel from the diesel storage vessel 40.

The first mixer 60 is connected to both the diesel storage vessel 40, via pump 41, and the gas pressure vessel 30, via the gas booster 50*b*. The first mixer 60 is used to mix natural gas supplied from the gas pressure vessel 30 and diesel supplied from the diesel storage vessel 40. The first mixer 60 is used to produce a homogeneous fluid fuel in the form of a homogeneous liquid fuel mixture that includes diesel saturated with natural gas. As discussed further below, the homogeneous liquid fuel mixture spontaneously combusts in the engine 20*b* and ignites the homogenous gas fuel mixture.

The mixing systems 70 are integrated into the gas booster 50*b*. The mixing systems 70 are connected to both the diesel storage vessel 40, via pump 41, and the gas pressure vessel 30, via the gas booster 50*b*. The mixing systems 70 are used to mix natural gas supplied from the gas pressure vessel 30 and diesel supplied from the diesel storage vessel 40 to produce a homogeneous fluid fuel in the form of a homogeneous gas fuel mixture.

A common rail engine 20*c* is fitted with a common rail system including a liquid fuel common rail 21 and a gas fuel common rail 23. Connected to the liquid fuel common rail 21 is a set of liquid fuel injectors 22. Connected to the gas fuel common rail 23 is a set of gas fuel injectors 24.

The homogenous liquid fuel mixture is supplied to the liquid fuel common rail 21, where it is injected through the liquid fuel injectors 22. The homogeneous gas fuel mixture is supplied to the gas fuel common rail 23, where it is injected through the gas fuel injectors 24.

In use, the first mixer 60 produces a homogeneous liquid fuel mixture that includes diesel saturated with natural gas. The homogeneous liquid fuel mixture is produced in the first mixer 60 by mixing natural gas supplied from the gas pressure vessel 30 and diesel supplied from the diesel storage vessel 40 by diesel pump 41.

At the same time, natural gas is supplied from the gas pressure vessel 30 at the desired pressure by the gas booster 50*b* through the gas line. Simultaneously, diesel is pumped by the diesel pump 41 from the diesel storage vessel 40 into the mixing systems 70. The natural gas and diesel are mixed in the mixing systems 70 to produce a homogeneous gas fuel mixture. The homogeneous gas fuel mixture can range from diesel saturated gas with as much as 20% of the mixture being diesels to a lean mixture with a low liquid content that remains sufficient to impart a lubricating quality to the natural gas. The lubricating quality imparted to the natural gas provides a sustained life for the gas fuel injectors 24 in a compression or spark ignition engine.

The homogeneous liquid fuel mixture is supplied to the common rail engine 20*c*, via the liquid fuel common rail 21, where it is injected through the liquid fuel injectors 22 into the engine 20*c*. The high pressure pump 61 pressurises the homogeneous liquid fuel mixture delivered to the liquid fuel injectors 22. At the same time, the homogeneous gas fuel mixture is supplied to the common rail engine 20*c*, via the gas fuel common rail 23, where it is injected through the gas fuel injectors 24 in the engine 20*c*.

In the engine 20*c*, the homogeneous liquid fuel mixture spontaneously combusts and ignites the homogeneous gas fuel mixture.

Both fuel mixtures (i.e., the homogeneous liquid fuel mixture and the homogeneous gas fuel mixture) lubricate the injectors 22, 24 with the natural gas contributing a significant quantity of the fuel required by the engine 20*c*. Additionally the dissolved natural gas in the homogeneous liquid fuel mixture significantly enhances the atomisation of the diesel which improves the combustion characteristics of the diesel.

Figure 4:
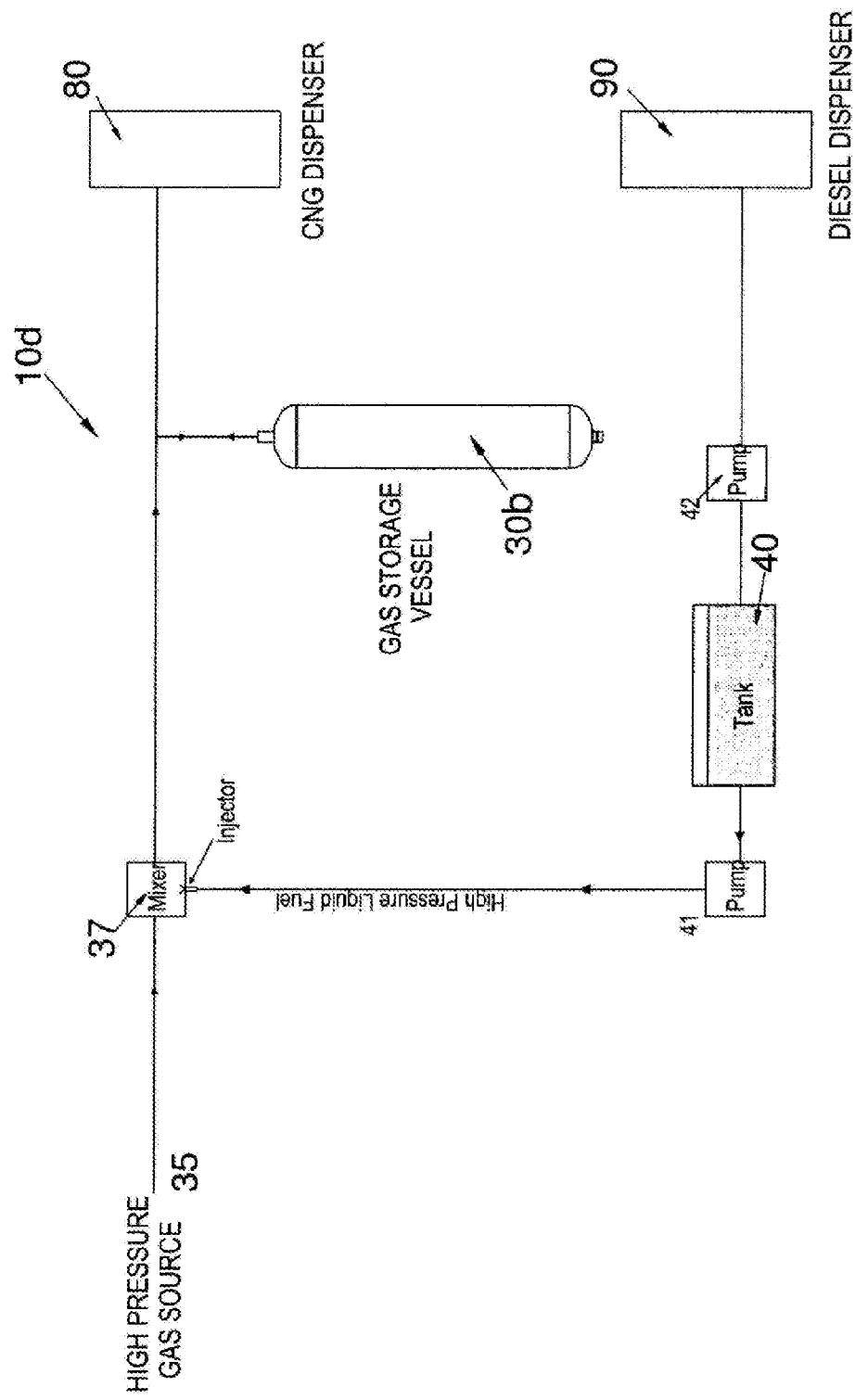
FIG. 4 is a schematic representation of an off-vehicle fuel system according to a fourth embodiment of the invention.

FIG. 4 shows a fourth embodiment of the present invention, including a fuel system 10*d* which in this case is not situated on a vehicle. The fuel mixing system 10*d* includes a high pressure natural gas source 35, a mixer 37, a diesel storage vessel 40, and an optional gas pressure vessel 30*b*. A CNG dispenser 80 and a liquid fuel dispenser 90 allow the transfer of gaseous and liquid fuels onto a vehicle.

The high pressure natural gas source 35 is created from a gas source and a natural gas delivery system. The natural gas delivery system is configured to deliver natural gas from the natural gas source at a desired pressure.

The mixer 37 is attached to both the diesel storage vessel 40, via pump 41, and the high pressure gas source 35. The mixer 37 is used to mix natural gas from the high pressure gas source 35 and a quantity of diesel supplied from the diesel storage vessel 40. The mixer 37 therefore is used to produce a homogeneous gas fuel mixture. The homogeneous gas fuel mixture can range from diesel saturated natural gas with as much as 20% of the mixture being diesel to a lean mixture with a low liquid content that remains sufficient to impart a lubricating quality to the natural gas. The lubricating quality imparted onto the natural gas assists in providing a sustained life for direct gas injector(s) in a compression or spark ignition engine. Also, the addition of a quantity of diesel (i.e., liquid fuel) into the natural gas results in a significant increase in the energy density of the homogeneous gas fuel mixture due to improved molecular packing of the natural gas in the presence of the higher hydrocarbons.

Those skilled in the art will appreciate that if the fuel mixture is saturated, then any lowering of the temperature of the gas pressure vessel 30b will result in an undesirable diesel liquid condensate in the bottom of the vessel 30b.

The diesel storage vessel 40 is typically used to hold diesel. However, it should be appreciated that other liquid fuels may also be utilised. A diesel storage vessel pump 41 is connected to the diesel storage vessel 40 in order to pump diesel from the diesel storage vessel 40.

The optional gas pressure vessel 30b stores the homogeneous gas fuel mixture until it is required to be dispensed onto a vehicle via the CNG dispenser 60. The operation of the on-vehicle system is described below.

Figure 5:
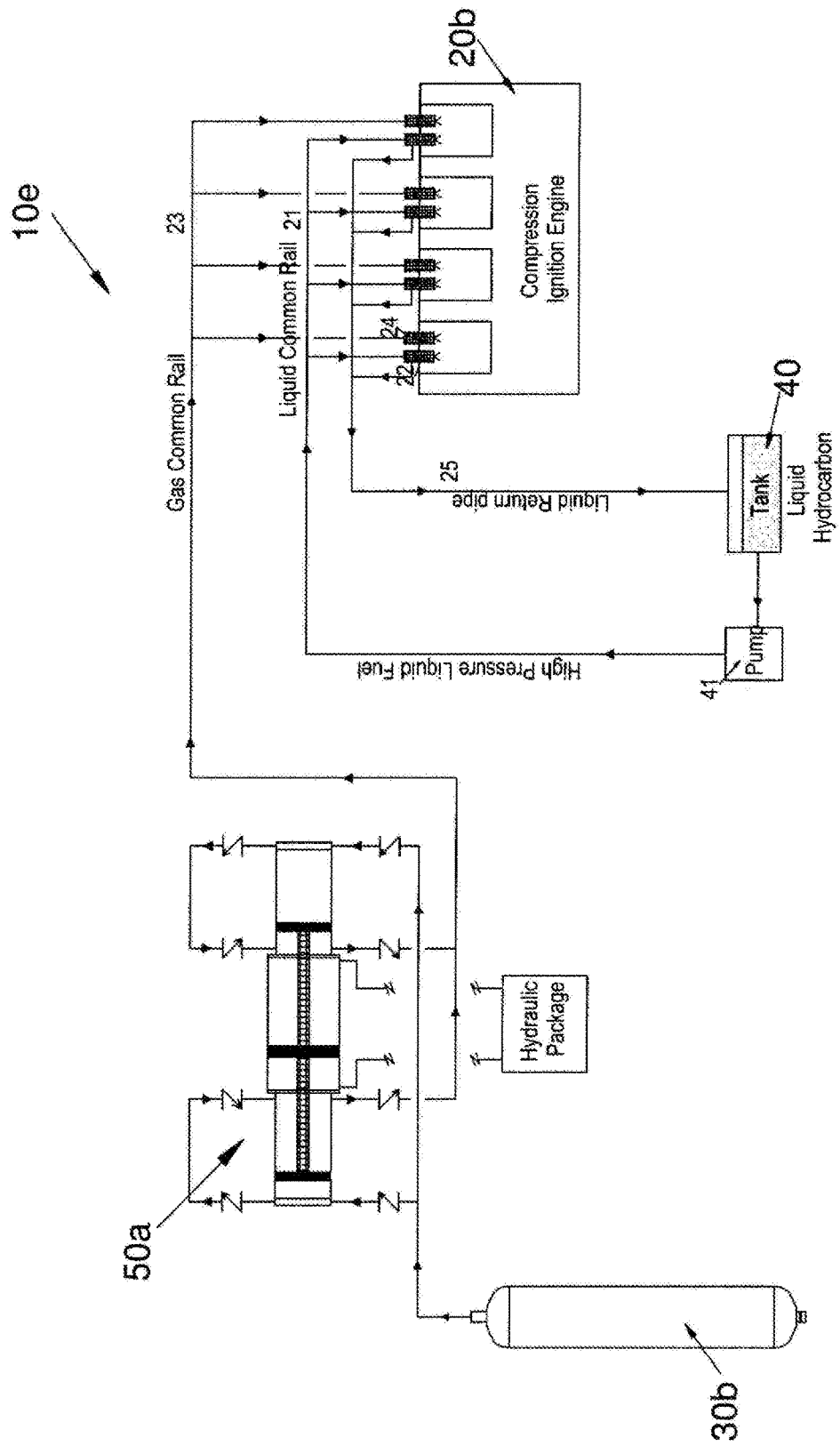
FIG. 5 is a schematic representation of an on-vehicle fuel system that utilises the off-vehicle fuel system shown in FIG. 4.

FIG. 5 shows a further embodiment of the present invention, including a fuel system 10e situated on a vehicle utilising a pre-mixed homogeneous gas fuel mixture as described in the prior embodiment.

The vehicle fuel system 10e includes an engine in the form of a common rail direct injection engine 20b, a gas pressure vessel 30b, a diesel storage vessel 40, and a gas booster 50a.

The gas pressure vessel 30b is configured to store pre-mixed homogeneous gas fuel mixture on a vehicle. It will be appreciated that the mixing of the gas fuel mixture in the vessel 30b can also occur on a vehicle, and thus a vehicle fuel tank in the form of the vessel 30b can achieve the added energy density benefits and corresponding lower fuel storage volume requirements described above. The gas booster 50a increases the pressure of the homogeneous gas fuel mixture to a desired pressure as it is withdrawn from the gas pressure vessel 30b.

The diesel storage vessel 40 is typically used to hold diesel. However, it should be appreciated that other liquid fuels may also be utilised. The diesel storage vessel 40 is therefore a liquid storage vessel. A diesel storage vessel pump 41 is connected to the diesel storage vessel 40 in order to pump diesel from the diesel storage vessel 40.

The common rail engine 20b is fitted with a common rail system including a liquid fuel common rail 21 and a gas fuel common rail 23. Connected to the liquid fuel common rail 21 is a set of liquid fuel injectors 22. Connected to the gas fuel common rail 23 is a set of gas fuel injectors 24.

The liquid fuel common rail 21 is connected to the diesel pump 41 and the gaseous fuel common rail 23 is connected to the gas booster 50a. The common rail engine 20b is a standard engine as known to people skilled in the art. It should be appreciated that the size of the engine 20b and number of injectors 22, 24 may be varied.

The injectors 22, 24 may be electrically activated or electro mechanically activated. Furthermore, the liquid fuel injectors 22 may be connected to a liquid return line 25 in which case part of the liquid fuel delivered thereto is returned to the diesel vessel 40.

In use, the homogeneous gas fuel mixture is supplied from the gas pressure vessel 30b at the desired pressure by the gas booster 50a through the gas line, into the common rail engine 20b via the gas common rail 23, where it is injected through the gas injectors 24. Simultaneously, diesel pumped by the diesel pump 41 from the diesel storage vessel 40 is directed through the liquid fuel line to the liquid fuel common rail 21 and injected into the cylinders via the liquid fuel injectors 22 where it spontaneously combusts. The spontaneous combustion of the diesel causes the homogeneous gas fuel mixture to also combust. Any diesel fuel that is not utilised by the common rail engine 20b is passed back into the diesel storage vessel 40.

This embodiment of the invention may also be coupled to a low pressure dual fuel system as is known in the art to reduce the quantity of gas requiring delivery at high pressure and hence allowing the use of smaller lost cost components.

Figure 6:
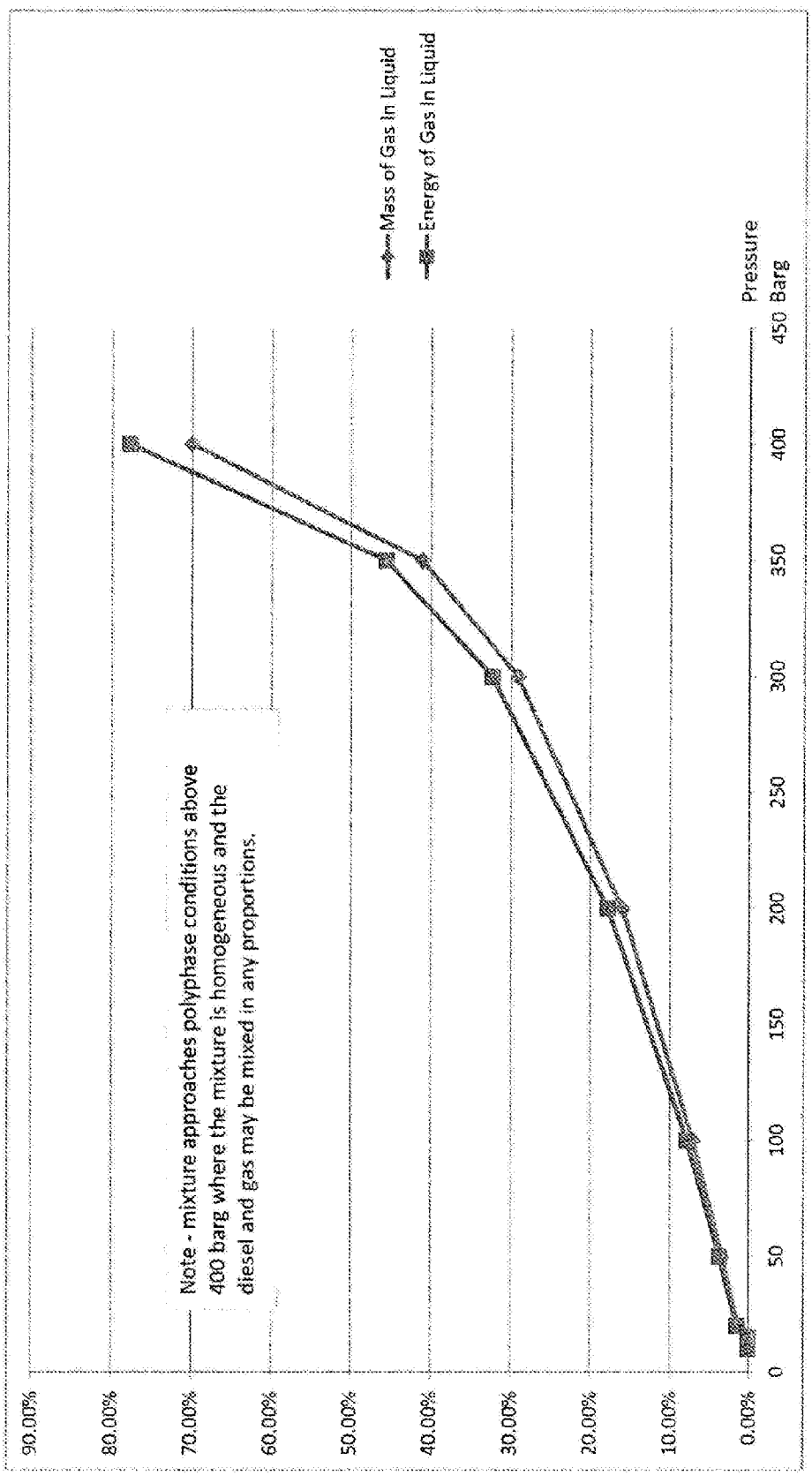
FIG. 6 is a graph illustrating the relationship between gas and diesel at varying saturation pressures of a diesel.

The graph contained in FIG. 6 depicts the relative diesel/natural gas relationships of the homogeneous liquid fuel mixtures at varying pressures according to a process simulator model. The homogeneous liquid fuel mixture has a number of distinct points along a spectrum.

For example, one point on the spectrum illustrates where diesel under pressure is saturated with a quantity of gas to produce a homogeneous liquid fuel mixture (referred to as GDiesel) containing up to 70% gas on a mass basis or 80% gas on an energy basis. This fluid is capable of being injected through a single high pressure common rail diesel injector (e.g., liquid fuel injector 22) into a compression ignition engine 20a and will spontaneously combust at the typical temperatures within a compression ignition engine 20a. The addition of the natural gas in the diesel does not impair the lubricating quality of the liquid fuel (e.g., diesel) and results in up to 80% of the liquid fuel being displaced by natural gas. This provides enhanced atomization of the homogeneous liquid fuel mixture as it exits the liquid fuel injector 22 due to the rapidly expanding natural gas in the mixture. This allows the use of a liquid fuel injector 22, which may be a standard industry available component as is known in the art.

Figure 7:
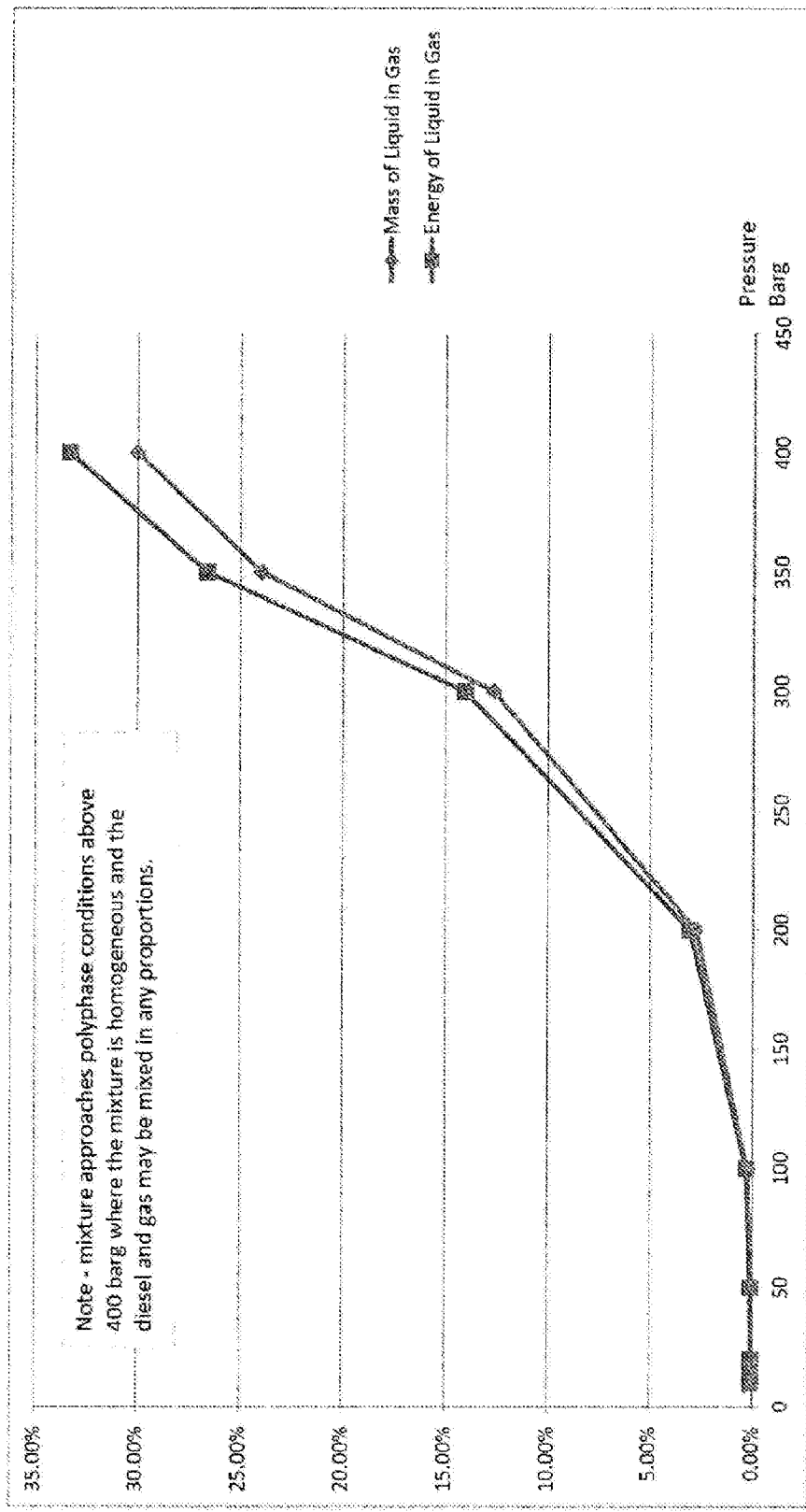
FIG. 7 is a graph illustrating the relationship between gas and diesel at varying saturation pressures of a natural gas.

The graph contained in FIG. 7 depicts the relative diesel/natural gas relationships of the homogeneous gas fuel mixtures at varying pressures according to a process simulator model. The homogeneous gas fuel mixture has a number of distinct points along a spectrum.

For example, one point on the spectrum illustrates where natural gas under pressure is mixed with an amount of diesel (nominally 15% to 20% on a mass basis depending on the pressure of the mixture) to produce a homogenous gas fuel mixture (referred to as DGas). The addition of this quantity of diesel (i.e., liquid fuel) into the natural gas results in a significant increase in the energy density of the homogeneous gas fuel mixture due to improved molecular packing of the natural gas in the presence of the higher hydrocarbons. Furthermore, this imparts an excellent lubricating quality to the natural gas which provides a sustained life for the gas fuel injector(s) 24.

This homogeneous gas fuel mixture is capable of being injected through a high pressure gas injector into a compression ignition engine 20. However, as this fuel does not spontaneously combust at the typical temperatures within a compression ignition engine 20, a second fuel stream, typically diesel (or the homogeneous liquid fuel mixture as described herein), is required to be injected to initiate combustion of the homogeneous gas fuel mixture. A spark plug may also be used for ignition of the homogeneous gas fuel mixture if the engine 20 is not a traditional compression ignition engine; for example, an Otto cycle or variant thereof.

In addition to the above, a further point on the spectrum of FIG. 7 occurs where a small quantity of diesel (nominally 2-5%) on a mass basis is mixed into a quantity of pressurized diesel resulting in an unsaturated homogenous gas mixture. The addition of the diesel stream results in an improved energy density and imparts an excellent lubricating quality to the natural gas which provides a sustained life for the gas fuel injector(s) 24. This homogenous gas fuel mixture is capable of being injected through a high pressure gas injector into a compression ignition engine 20. However, as this fuel does not spontaneously combust at the typical temperatures within a compression ignition engine 20, a second fuel stream, typically diesel (or the homogeneous liquid fuel mixture as described herein), is required to be injected to initiate combustion of the gas fuel mixture mixture. A spark plug may also be used for ignition of the homogeneous gas fuel mixture if the engine 20 is not a traditional compression ignition engine; for example, an Otto cycle engine or variant thereof.

Finally, it should be noted that by increasing the pressure at which the diesel/natural gas streams are mixed to 470 barg or above, a homogeneous poly phase fluid will result. When diesel and gas are mixed as a poly phase fluid the high pressure pump attached to the first mixer 60 is not required provided the delivery pressure to the injector is sufficiently high to maintain the fluid in a poly phase state. Additionally this homogeneous liquid fuel mixture can have any ratio of natural gas and diesel components. However, when the homogeneous fluid fuel mixture is used to spontaneously initiate combustion in either a liquid phase or in a poly phase, the limiting factor on the proportion of natural gas that can reside within the mixture is the level at which the mixture no longer spontaneously ignites in an engine 20. This level will vary engine to engine and will also vary with the peak combustion air temperature of the engine on the compression stroke.

Figure 8:
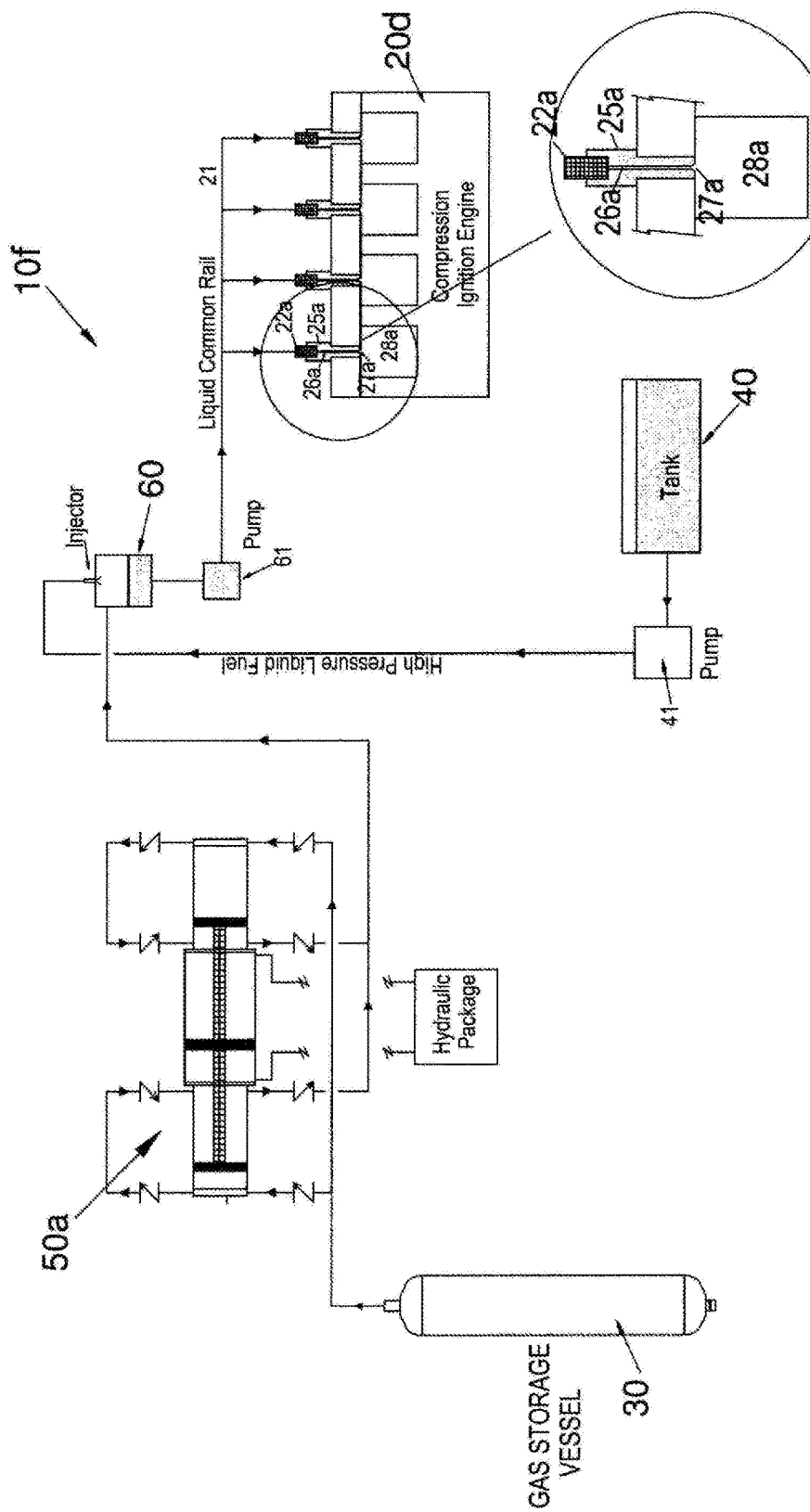
FIG. 8 is a schematic illustrating a further embodiment of the system shown in FIG. 1.

FIG. 8 shows an arrangement of a compression ignition engine 20d in the context of the gas saturated liquid fuel mixture system 10f similar to the system 10a described in FIG. 1. However, instead of a conventional liquid fuel injector mounted in the head, the engine 20d is fitted with a set of liquid fuel injectors 22a in the form of GDI injectors. The GDI injectors are connected to the liquid fuel common rail 21. The injectors 22a are inserted into a mounting sleeve 25a which contains capillary pathway 26a connecting the injector 22a to the combustion chamber 28a. The mounting sleeve 25a connects to the head in much the same manner as the conventional liquid fuel injectors. A nozzle 27a may be provided at the end of the capillary pathway to enhance distribution of the liquid fuel mixture mixture.

In use, the homogeneous liquid fuel mixture is delivered to the fuel injectors 22a at a nominal pressure between 250 and 350 barg (as used in the embodiment shown in FIG. 1). At a predetermined point during the compression stroke, the injectors 22a fire a metered quantity of the homogeneous liquid fuel mixture into the capillary pathway 26a. The significantly lower pressure (determined by the engine 20d compression ratio and turbo boost settings) causes the natural gas dissolved in the homogenous fluid fuel (at high pressure) to expand explosively out of the injectors 22a. The natural gas and diesel therefore accelerate through the capillary pathway 26a, through the capillary nozzle 27a and into the combustion chamber 28a where it mixes with hot compressed air and spontaneously ignites. The action of explosive decompression of the dissolved natural gas and extreme velocities in the capillary pathway enhances the atomisation of the liquid component of the homogeneous liquid fuel mixture thereby promoting clean and efficient combustion.

It will be apparent to persons skilled in the art that the system as described in the first embodiment of the invention together with this optional remote injector can be coupled with a low pressure dual fuel system to achieve greater displacement of liquid fuel with gas.

Figure 9:
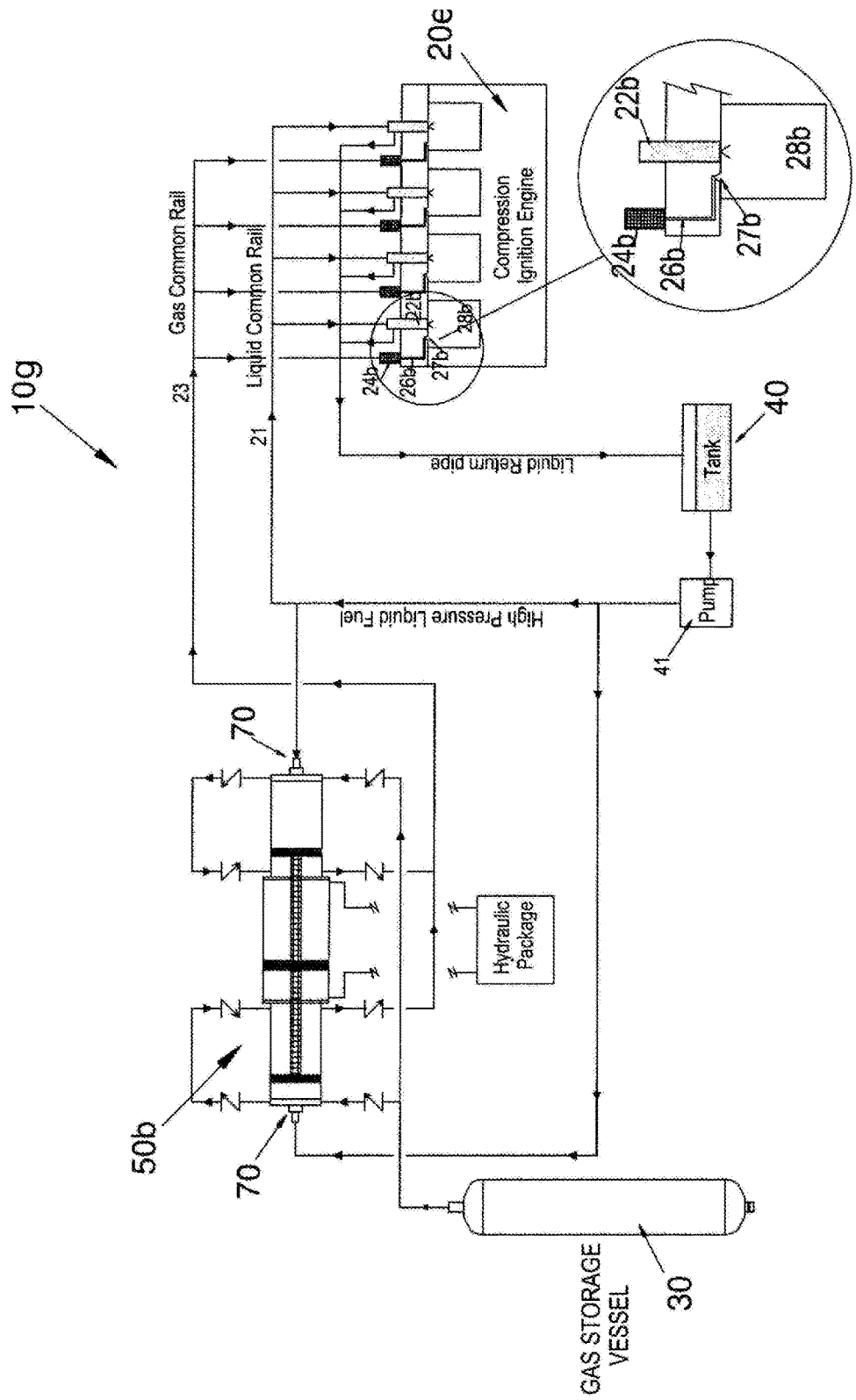
FIG. 9 is a schematic illustrating a further embodiment of the system shown in FIG. 2.

FIG. 9 shows an arrangement of a compression ignition engine 20e in the context of the diesel saturated gas fuel system 10g that is similar to the system 10b described in FIG. 2. The engine 20e is fitted with a set of liquid fuel injectors 22b in the form of conventional diesel injectors. The conventional diesel injectors 22 are connected to the liquid fuel rail 21. The engine 20e is also fitted with a set of gas fuel injectors in the form of GDI injectors 24b, which are remotely mounted and connected to the outside of the engine 20e.

The GDI injectors 24b are connected by a capillary pathway 26 between the injector 24b and the combustion chamber 28b. A nozzle 27b may be provided at the end of the capillary pathway to enhance distribution of the gas fuel mixture mixture.

In use, the homogeneous gas fuel mixture is delivered to the GDI injectors 24b at a nominal pressure between 250 and 350 barg (as used in the embodiment shown in FIG. 2). At a predetermined point during the compression stroke, the GDI injector fires a metered quantity of the homogeneous gas fuel mixture into the capillary pathway 26b. The significantly lower pressure (determined by the engine 20e compression ratio and turbo boost settings) causes the natural gas to expand explosively out of the injectors 24b. The natural gas therefore accelerates through the capillary pathway 26b out of the nozzle 27b and into the combustion chamber 28b. Due to the extreme velocities in the capillary pathway 26b and the short duration of the injection pulse, the liquid fuel mixture molecules which had previously been mixed with the natural gas in the homogeneous gas fuel mixture are not able to coalesce, preventing liquid droplets from forming. At a predetermined point during the compression stroke, the conventional diesel injectors 22b are fired, injecting a small quantity of diesel pilot fuel into the combustion chamber to initiate the combustion process in the air and the homogeneous gas fuel mixture mixture. Once ignited by the injection of the liquid fuel mixture, the entire fuel mixture burns cleanly and completely.

It will be apparent to persons skilled in the art that the system as described in the second embodiment of the invention and this optional embodiment that this fuel system can be coupled with a low pressure dual fuel system to achieve greater displacement of liquid fuel by gas.

Figure 10:
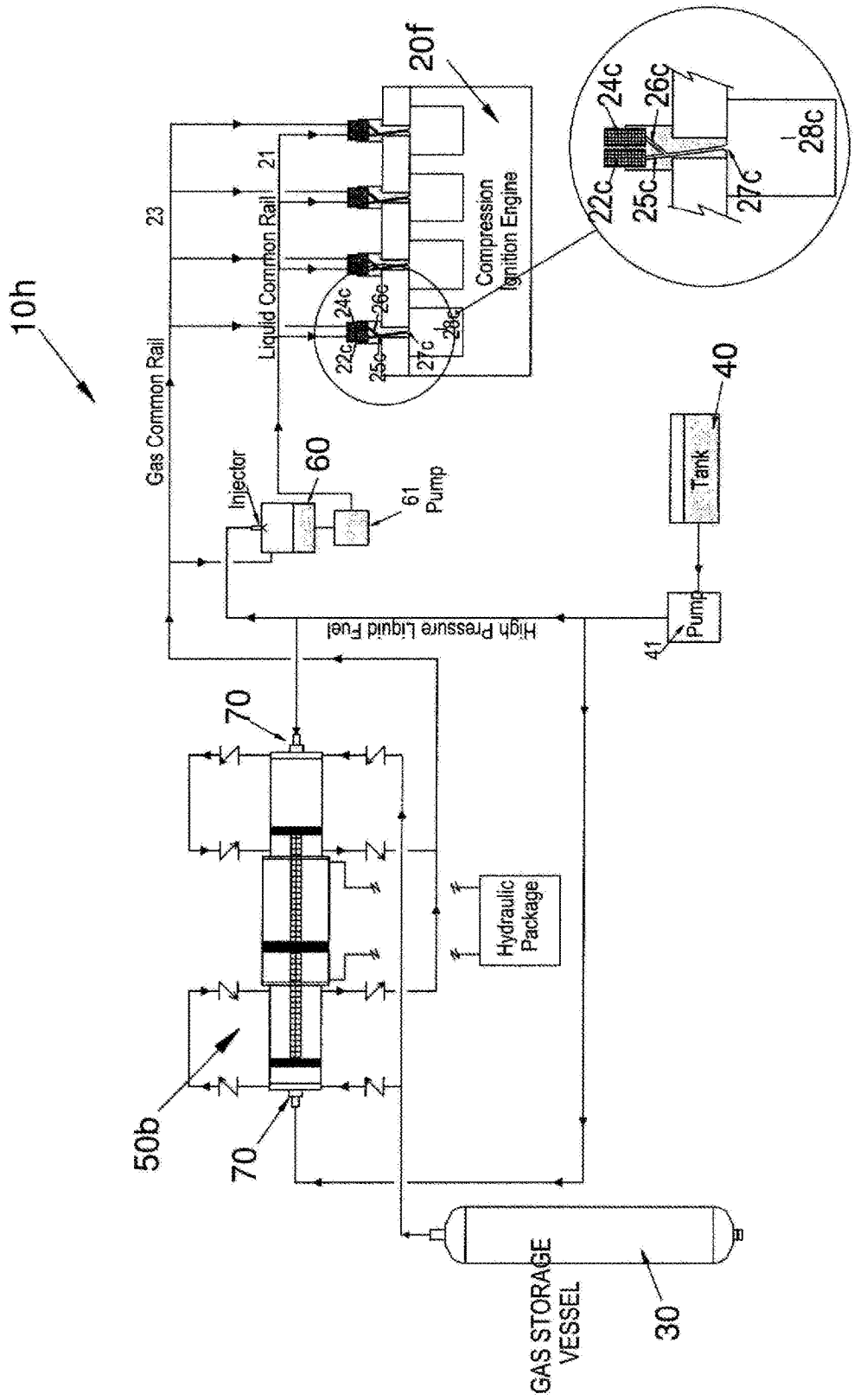
FIG. 10 is a schematic illustrating a further embodiment of the system shown in FIG. 3.

FIG. 10 shows an arrangement for a compression ignition engine 20f in the context of a vehicle fuel system 10h that is similar to the system 10c described in FIG. 3. The engine 20f is fitted with remotely mounted liquid fuel injectors in the form of GDI liquid injectors 22c that are connected to the liquid fuel common rail 21. The engine 20b is also fitted with remotely mounted gas fuel injectors in the form of GDI gas injectors 24c that are connected to the gas common rail 23. The GDI liquid injectors 22c are connected by a capillary pathway 25c between the injector 22c and the combustion chamber 28c. The GDI gas injectors 24c are connected to the capillary pathway 25c by a second capillary pathway 26c. Optionally the capillary pathway 26c connects directly to the combustion chamber 28c. The capillary pathway(s) is (are) connected to an optional nozzle 27c at the interface with the combustion chamber 28c.

In use, the homogeneous liquid fuel mixture is delivered to the GDI liquid injectors 22c from the first mixer 60, via the high pressure pump 61, at a nominal pressure between of 200 barg to 500 barg (as used in the embodiment shown in FIG. 3). At a predetermined point during the compression stroke, the GDI gas injector 24c fires a metered quantity of the homogeneous gas fuel mixture into the capillary pathway 26c where it expands rapidly into capillary pathway 25c and then through nozzle 27c into the combustion chamber 28c.

At a second predetermined point during the compression stroke the GDI liquid injector 22c fires a metered quantity of the homogeneous liquid fuel mixture into the capillary pathway 25c where it expands rapidly and mixes with the gas fuel mixture entering the capillary pathway 25c from the capillary pathway 26c. The liquid phase mixture is auto igniting in its nature and combusts spontaneously on mixing with the air in the combustion chamber 28c, in turn also igniting the homogeneous gas fuel mixture. Optionally the GDI gas injector 24c is turned off for the duration of the time the GDI liquid fuel injector 22c is firing to prevent dilution of the liquid fuel mixture in the capillary pathway 25c. On exiting the GDI injectors 22c, 24c, the significantly lower pressure in the capillary pathways 25c, 26c (determined by the engine 20f compression ratio and turbo boost settings) causes the natural gas to expand explosively and accelerate through the capillary pathways 25c, 26c out of the nozzle 27c and into the combustion chamber 28c. Due to the extreme velocities in the capillary pathways 25c, 26c and the short duration of the injection pulse, the liquid fuel molecules in both the homogeneous gas fuel mixture and homogeneous liquid fuel mixture are not able to coalesce preventing liquid droplets from forming. This results in the fuel burning cleanly and completely.

It will be apparent to persons skilled in the art that the system as described in the third embodiment of the invention and this optional embodiment that this fuel system can be coupled with a low pressure dual fuel system to achieve greater displacement of liquid fuel by gas.

The vehicle fuels and fuel systems described above provides an effective alternative to current systems which deliver unlubricated gas and pure liquid fuel mixtures to the engine combustion chamber.

The above description of various embodiments of the present invention is provided for purposes of description to one of ordinary skill in the related art. It is not intended to be exhaustive or to limit the invention to a single disclosed embodiment. As mentioned above, numerous alternatives and variations to the present invention will be apparent to those skilled in the art of the above teaching. Accordingly, while some alternative embodiments have been discussed specifically, other embodiments will be apparent or relatively easily developed by those of ordinary skill in the art. Accordingly, this patent specification is intended to embrace all alternatives, modifications and variations of the present invention that have been discussed herein, and other embodiments that fall within the scope of the disclosure.

The invention claimed is:

1. A direct injection vehicle fuel system comprising:
   a gas pressure vessel and associated gas pressurisation system to deliver natural gas at a desired pressure;
   a liquid fuel storage vessel and associated reservoir pump to deliver liquid fuel at a desired pressure;
   a mixing system configured to receive and mix the liquid fuel from the liquid fuel storage vessel and the natural gas from the gas pressure vessel to produce a homogeneous fluid fuel mixture;
   a high pressure pump; and
   a common rail system connected to the mixing system via the high pressure pump and connecting the mixing system to an engine that consumes the homogeneous fluid fuel mixture;
   wherein the high pressure pump increases a pressure of the homogeneous fluid fuel mixture before the mixture is consumed by the engine.

2. The fuel system of claim 1, wherein the mixing system includes a first mixer configured to receive and mix the liquid from the liquid fuel storage vessel and natural gas from the gas pressure vessel to produce a homogeneous liquid fuel mixture.

3. The fuel system of claim 2, wherein the homogeneous liquid fuel mixture includes a liquid fuel mixture that is saturated with natural gas.

4. The fuel system according to claim 2, wherein the system includes a pressure swing upwards, after the first mixer, to further ensure homogenous mixing of the homogeneous liquid fuel mixture.

5. The fuel system according to claim 2, wherein the system includes a temperature swing downwards, after the first mixer, to further ensure homogenous mixing of the homogeneous liquid fuel mixture.

6. The vehicle fuel system of claim 2, wherein the associated gas pressurisation system includes a gas booster which maintains the delivery pressure of the natural gas within a desired range as it is withdrawn from the gas pressure vessel.

7. The vehicle fuel system of claim 6, wherein the gas booster includes a second mixer configured to receive and mix the liquid fuel from the liquid fuel storage vessel and natural gas from the gas pressure vessel to produce a homogeneous gas fuel mixture.

8. The fuel system according to claim 1, wherein the mixing system includes a second mixer configured to receive and mix the liquid fuel from the liquid fuel storage vessel and natural gas from the natural gas delivery system to produce a homogeneous gas fuel mixture.

9. The fuel system of claim 8, wherein the energy density of the homogeneous gas fuel mixture is greater than an energy density of the natural gas.

10. The vehicle fuel system according to claim 8, wherein the common rail system includes:
    a gas fuel common rail being supplied with the homogeneous gas fuel mixture and connected to at least one gas fuel mixture injector; and
    a liquid fuel common rail being connected to at least one liquid fuel injector.

11. The vehicle fuel system of claim 10, wherein the at least one gas fuel injector and the at least one liquid fuel injector are mounted to deliver fuel directly into a combustion chamber of the engine.

12. The vehicle fuel system of claim 10, wherein the at least one gas fuel injector or the at least one liquid fuel injector are mounted adjacent to a combustion chamber with one or more capillary pathways delivering fuel into the combustion chamber.

13. The vehicle fuel system of claim 10, wherein the at least one liquid fuel injector injects a homogeneous liquid fuel mixture at a pressure between 250 barg and 350 barg.

14. The vehicle fuel system of claim 13, wherein the homogeneous liquid fuel mixture is used to initiate combustion of the homogeneous gas fuel mixture.

\* \* \* \* \*